US011000808B2

(12) United States Patent
Ariji et al.

(10) Patent No.: US 11,000,808 B2
(45) Date of Patent: May 11, 2021

(54) SHEET-SHAPED HOLLOW FIBER MEMBRANE MODULE AND MEMBRANE SEPARATION UNIT

(71) Applicant: TOYOBO CO., LTD., Osaka (JP)

(72) Inventors: Akihiro Ariji, Osaka (JP); Katsushige Marui, Otsu (JP); Atsuo Kumano, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 65 days.

(21) Appl. No.: 16/324,632

(22) PCT Filed: Aug. 2, 2017

(86) PCT No.: PCT/JP2017/028081
§ 371 (c)(1),
(2) Date: Feb. 11, 2019

(87) PCT Pub. No.: WO2018/034153
PCT Pub. Date: Feb. 22, 2018

(65) Prior Publication Data
US 2019/0201850 A1 Jul. 4, 2019

(30) Foreign Application Priority Data

Aug. 18, 2016 (JP) .............................. JP2016-160708

(51) Int. Cl.
*B01D 63/04* (2006.01)
*B01D 63/02* (2006.01)
(Continued)

(52) U.S. Cl.
CPC ............ *B01D 63/04* (2013.01); *B01D 63/02* (2013.01); *B01D 63/026* (2013.01); *B01D 69/08* (2013.01);
(Continued)

(58) Field of Classification Search
CPC ...... B01D 63/02; B01D 63/04; B01D 63/046; B01D 63/026; B01D 69/08;
(Continued)

(56) References Cited

U.S. PATENT DOCUMENTS

| 3,228,877 A | * | 1/1966 | Mahon ................. B01D 61/025 |
|---|---|---|---|
| | | | 210/638 |
| 3,342,729 A | | 9/1967 | Strand |

(Continued)

FOREIGN PATENT DOCUMENTS

| CA | 837414 A | 3/1970 |
|---|---|---|
| CN | 102105211 A | 6/2011 |

(Continued)

OTHER PUBLICATIONS

International Search Report dated Oct. 31, 2017, issued in counterpart application No. PCT/JP2017/028081 (1 page).

(Continued)

*Primary Examiner* — Liam Royce
(74) *Attorney, Agent, or Firm* — Westerman, Hattori, Daniels & Adrian, LLP

(57) ABSTRACT

A sheet-shaped hollow fiber membrane module includes a casing having a flat shape, the casing including a supply port and a discharge port, and a plurality of hollow fiber membranes accommodated inside the casing. The casing includes a plurality of the supply ports on one main surface of the casing and a plurality of the discharge ports on the other main surface of the casing, at least one of the plurality of the supply ports is closable, and at least one of the plurality of the discharge ports is closable. Each of the plurality of hollow fiber membranes includes a first opening at one end of the hollow fiber membrane and a second opening at the other end of the hollow fiber membrane, and the first opening and the second opening communicate with an (Continued)

outside of the casing and do not communicate with an inside of the casing.

14 Claims, 12 Drawing Sheets

(51) Int. Cl.
*B01D 69/08* (2006.01)
*C02F 1/44* (2006.01)
*B01D 61/00* (2006.01)

(52) U.S. Cl.
CPC .......... *C02F 1/441* (2013.01); *B01D 2313/08* (2013.01); *B01D 2313/10* (2013.01); *B01D 2313/12* (2013.01); *B01D 2313/20* (2013.01); *B01D 2313/21* (2013.01); *B01D 2313/32* (2013.01); *B01D 2313/54* (2013.01); *B01D 2315/10* (2013.01); *B01D 2317/02* (2013.01); *B01D 2317/04* (2013.01)

(58) Field of Classification Search
CPC ............ B01D 2313/21; B01D 2313/32; B01D 2313/54; B01D 2313/08; B01D 2313/10; B01D 2313/12; B01D 2313/20; B01D 2317/02; B01D 2317/04; B01D 2315/10; B01D 61/002; C02F 1/44; C02F 1/441
See application file for complete search history.

(56) References Cited

U.S. PATENT DOCUMENTS

| | | | | |
|---|---|---|---|---|
| 4,911,846 | A * | 3/1990 | Akasu | B01D 63/02 210/321.8 |
| 5,141,031 | A * | 8/1992 | Baurmeister | B01D 63/02 139/383 R |
| 6,280,626 | B1 | 8/2001 | Miyashita et al. | |
| 2006/0014274 | A1 | 1/2006 | Klaus | |
| 2011/0127206 | A1 | 6/2011 | Meyer-Blumenroth et al. | |
| 2013/0098821 | A1 * | 4/2013 | Espenan | B01D 63/043 210/232 |
| 2014/0175011 | A1 | 6/2014 | Benton et al. | |
| 2015/0265976 | A1 | 9/2015 | Shimizu et al. | |

FOREIGN PATENT DOCUMENTS

| | | |
|---|---|---|
| CN | 102908877 A | 2/2013 |
| CN | 104955552 A | 9/2015 |
| JP | 63-240916 A | 10/1988 |
| JP | 2000-51672 A | 2/2000 |
| JP | 2007-061671 A | 3/2007 |
| JP | 2008-10205 A | 1/2008 |
| JP | 4631608 B2 | 2/2011 |
| JP | 2014-512951 A | 5/2014 |
| WO | 2012/148864 A1 | 11/2012 |
| WO | 2013/118859 A1 | 8/2013 |

OTHER PUBLICATIONS

Extended (Supplementary) European Search Report dated Mar. 4, 2020, issued in counterpart application No. EP 17841380.3. (8 pages).

Office Action dated Dec. 30, 2020, issued in counterpart Chinese Patent Application No. 201780050533.2 (w/ English translation; 15 pages).

* cited by examiner

SHEET-SHAPED HOLLOW FIBER MEMBRANE MODULE AND MEMBRANE SEPARATION UNIT

TECHNICAL FIELD

The present invention relates to a sheet-shaped hollow fiber membrane module and a membrane separation unit.

BACKGROUND ART

Forward osmosis (FO) is a phenomenon in which water of a side of water to be treated (a feed solution) at a low concentration (a low osmotic pressure) moves toward a solution (a draw solution) at a high concentration (a high osmotic pressure) via a semipermeable membrane. On the other hand, in a field of water treatment, a water treatment method using a reverse osmosis (RO) process has been conventionally known. The reverse osmosis process is a process in which water moves from high concentration water to be treated to a low concentration solution side contrary to the forward osmosis by artificially applying a high pressure.

However, since the reverse osmosis process requires a high pressure, energy consumption is extremely large and energy efficiency is low. Therefore, in recent years, in order to increase the energy efficiency of water treatment, a forward osmosis water treatment system utilizing the natural osmosis phenomenon that need not artificially apply pressure has been proposed.

For example, a forward osmosis water treatment system using a hollow-fiber-type semipermeable membrane is disclosed in International Publication No. 2013/118859 (PTL 1). A hollow fiber membrane is advantageous in that a membrane area per module is increased and membrane permeation efficiency is increased compared to a spiral type semipermeable membrane or the like. In addition, since the hollow fiber membrane itself has a separation and a self-supporting function, spacers are unnecessary, and a packing density and volumetric efficiency of the membrane element is increased. Therefore, there is a feature that a permeate flow rate per unit volume of a membrane element is increased.

On the other hand, various kinds of the draw solutions used for the forward osmosis water treatment system are known, and a high viscosity solution such as a polyglycol copolymer that is used as the draw solution is disclosed in, for example, National Patent Publication No. 2014-512951 (PTL 2).

In addition, although a membrane separation apparatus in which modules having a plurality of flat sheet membranes are connected in multiple stages is disclosed in PTL 3 (US Patent Application Publication No. 2014/0175011A), the membrane permeation efficiency is not increased as in the case where the hollow fiber membrane is used.

Further, a membrane separation apparatus in which a plurality of sheet-shaped hollow fiber membrane modules are disposed in parallel is disclosed in PTL 4 (Japanese Patent Laying-Open No. 2000-51672), each of the sheet-shaped hollow fiber membrane modules includes a knitted fabric integrated by threads in a state where a plurality of hollow fibers are disposed in parallel.

CITATION LIST

Patent Literature

PTL 1: International Publication No. 2013/118859
PTL 2: National Patent Publication No. 2014-512951
PTL 3: US Patent Application Publication No. 2014/0175011A
PTL 4: Japanese Patent Laying-Open No. 2000-51672

SUMMARY OF INVENTION

Technical Problem

Even when, for example, a high viscosity draw solution flows outside the hollow-fiber-type semipermeable membrane in an existing cylindrical hollow fiber membrane element described in PTL 1, a flow velocity near a distribution pipe in a center of the membrane element is large to increase pressure loss, and a necessary draw solution flow rate for maintaining sufficient effective osmotic pressure difference inside and outside the hollow-fiber-type semipermeable membrane is not secured. Therefore, membrane separation efficiency of such as the forward osmosis water treatment is sometimes decreased. Even in the membrane separation apparatus in which the plurality of sheet-shaped hollow fiber membrane modules are arranged in parallel described in PTL 4, since the same fluid passes through the plurality of sheet-shaped hollow fiber membrane modules, the pressure loss is large.

In view of the above problem, it is an object of the present invention to reduce pressure loss and to suppress decrease in membrane separation efficiency in a membrane separation apparatus using a hollow fiber membrane with a high membrane permeation efficiency.

Solution to Problem

[1]
A sheet-shaped hollow fiber membrane module including: a casing having a flat shape, the casing including a supply port and a discharge port; and a plurality of hollow fiber membranes accommodated inside the casing, wherein the casing includes a plurality of the supply ports on one main surface of the casing and a plurality of the discharge ports on the other main surface of the casing, at least one of the plurality of the supply ports is closable, at least one of the plurality of the discharge ports is closable, each of the plurality of hollow fiber membranes includes a first opening at one end of the hollow fiber membrane and a second opening at the other end of the hollow fiber membrane, and the first opening and the second opening communicate with an outside of the casing and do not communicate with an inside of the casing.

[2]
The sheet-shaped hollow fiber membrane module according to [1], wherein the plurality of the supply ports and the plurality of the discharge ports are disposed outside the plurality of hollow fiber membranes when seen from a direction perpendicular to the main surfaces of the casing.

[3]
The sheet-shaped hollow fiber membrane module according to [2], wherein the plurality of the supply ports include two of the supply ports disposed at positions facing the plurality of hollow fiber membranes when seen from the direction perpendicular to the one main surface of the casing, one of the two supply ports is closable, and the plurality of the discharge ports include two of the discharge ports disposed at positions facing the plurality of hollow fiber membranes when seen from the direction perpendicular to the other main surface of the casing, one of the two discharge ports is closable.

[4]

The sheet-shaped hollow fiber membrane module according to any one of [1] to [3], further including: a first flow path that is disposed outside the casing when seen from the direction perpendicular to the main surfaces of the casing and that communicates with an inside of each of the plurality of hollow fiber membranes via the first opening; and a second flow path that is disposed outside the casing when seen from the direction perpendicular to the main surfaces of the casing and that communicates with the inside of each of the plurality of hollow fiber membranes via the second opening, wherein the first flow path includes a first inlet and a first outlet and the second flow path includes a second inlet and a second outlet, one of the first inlet and the second inlet is closable, and one of the first outlet and the second outlet is closable.

[5]

The sheet-shaped hollow fiber membrane module according to [4], wherein the first flow path and the second flow path are disposed at positions facing the plurality of hollow fiber membranes respectively when seen from the direction perpendicular to the main surfaces of the casing.

[6]

The sheet-shaped hollow fiber membrane module according to any one of [1] to [5], wherein the plurality of hollow fiber membranes are disposed with a predetermined gap therebetween in a direction parallel to the main surfaces of the casing.

[7]

The sheet-shaped hollow fiber membrane module according to any one of [1] to [6], wherein the plurality of hollow fiber membranes include a hollow fiber membrane bundle sheet integrated in a state where the plurality of hollow fiber membranes are disposed in a plane.

[8]

The sheet-shaped hollow fiber membrane module according to [7], wherein the plurality of hollow fiber membranes are tied each other by a weft, to be integrated with in the hollow fiber membrane bundle sheet.

[9]

The sheet-shaped hollow fiber membrane module according to [7], wherein the hollow fiber membrane bundle sheet includes a straightening sheet having a plurality of through holes, and the plurality of hollow fiber membranes are fixed to one surface of the straightening sheet, to be integrated with in the hollow fiber membrane bundle sheet.

[10]

The sheet-shaped hollow fiber membrane module according to any one of [1] to [8], further including a straightening sheet that includes a plurality of through holes and that is disposed in the casing.

[11]

A membrane separation unit including a plurality of the sheet-shaped hollow fiber membrane modules according to any one of [1] to [10].

Advantageous Effects of Invention

According to the present invention, in a membrane separation apparatus using a hollow fiber membrane with high membrane permeation efficiency, pressure loss is reduced and membrane separation efficiency is suppressed from decreasing.

DESCRIPTION OF EMBODIMENTS

Figure 1:
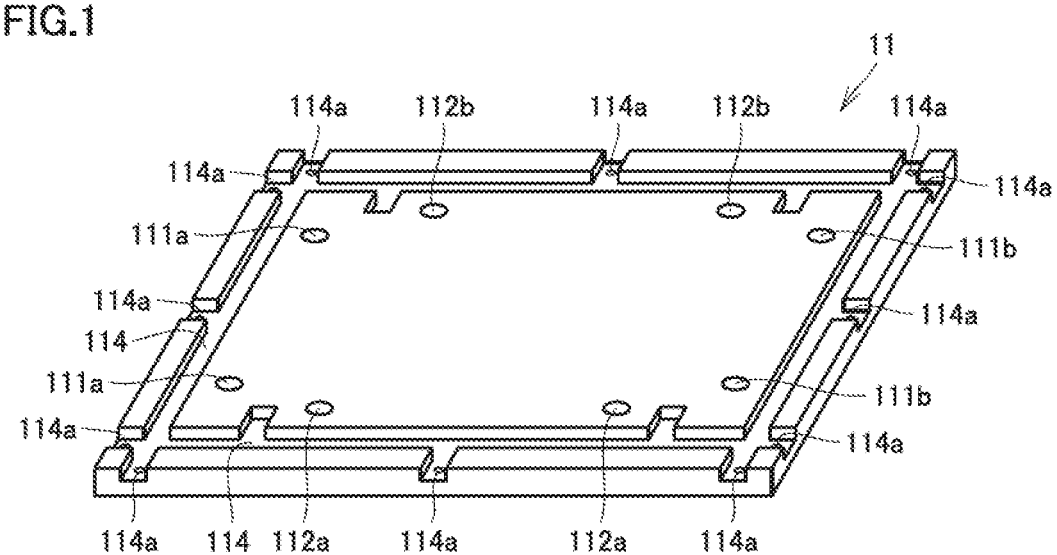
FIG. 1 is a schematic view for describing a configuration of a part of a sheet-shaped hollow fiber membrane module according to an embodiment of the present invention.

With reference to the drawings, an embodiment of the present invention will be described hereinafter. Note that the same reference numerals denote the same parts or corresponding parts in the drawings.

[Sheet-Shaped Hollow Fiber Membrane Module]

First, a configuration of a sheet-shaped hollow fiber membrane module of the present embodiment will be described with reference to FIGS. 1 to 7.

Figure 2:
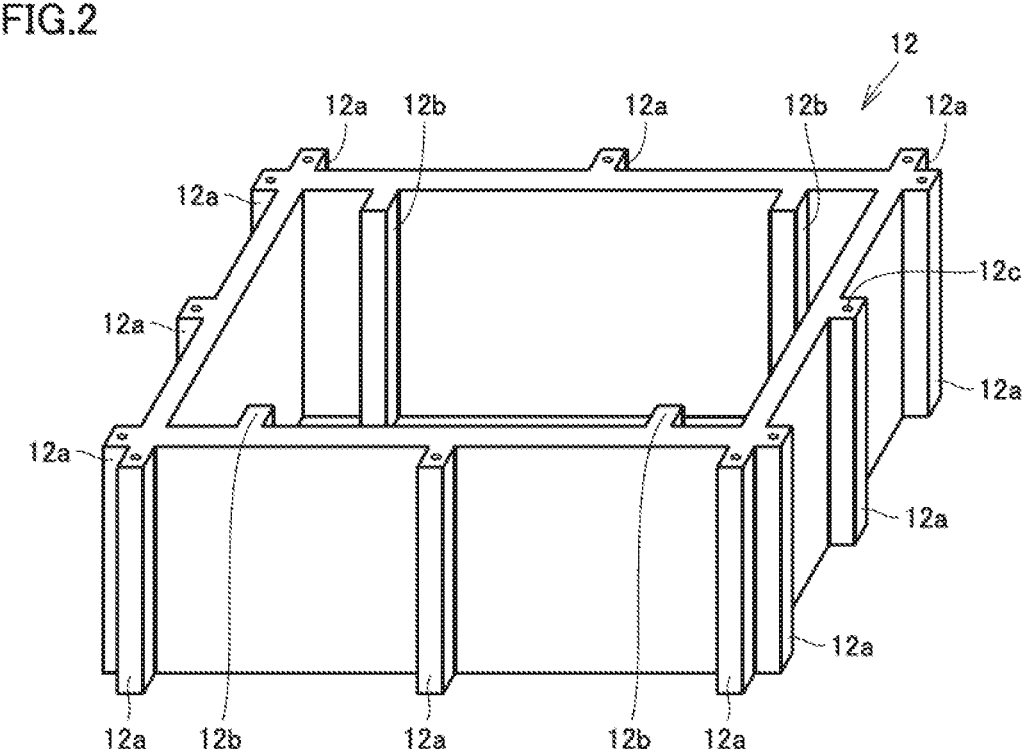
FIG. 2 is another schematic view for describing a configuration of a part of the sheet-shaped hollow fiber membrane module according to the embodiment of the present invention.
Figure 3:
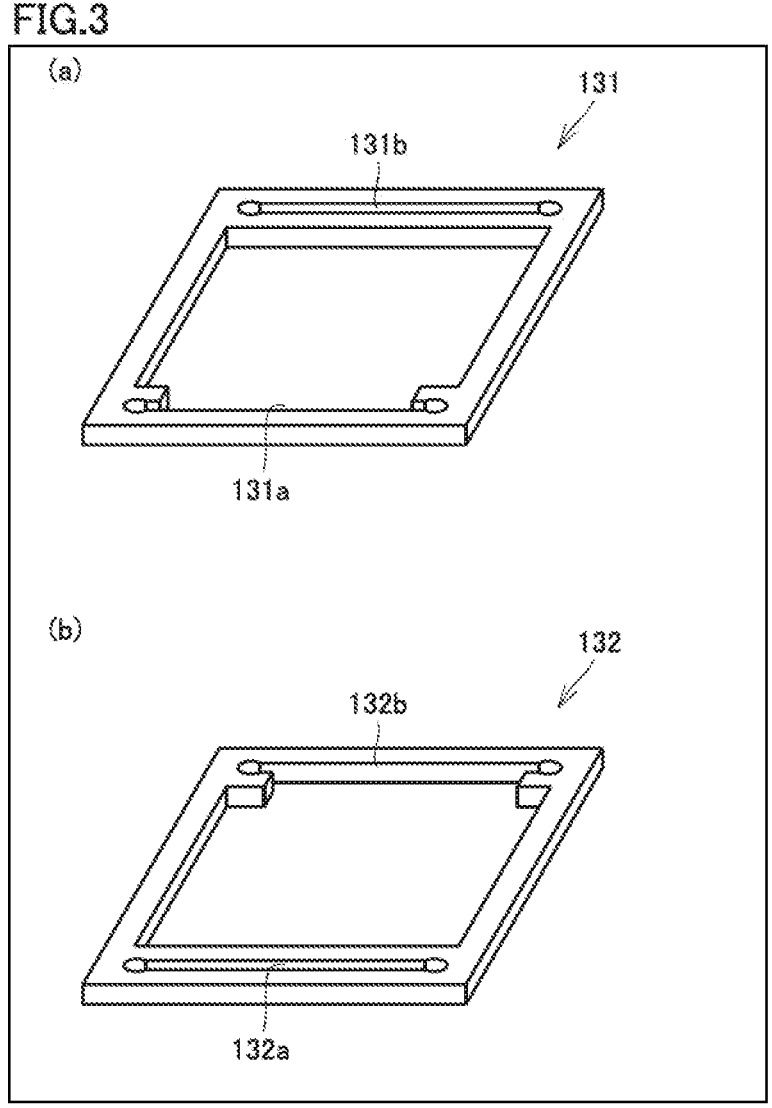
FIG. 3 is another schematic view for describing a configuration of a part of the sheet-shaped hollow fiber membrane module according to the embodiment of the present invention.
Figure 4:
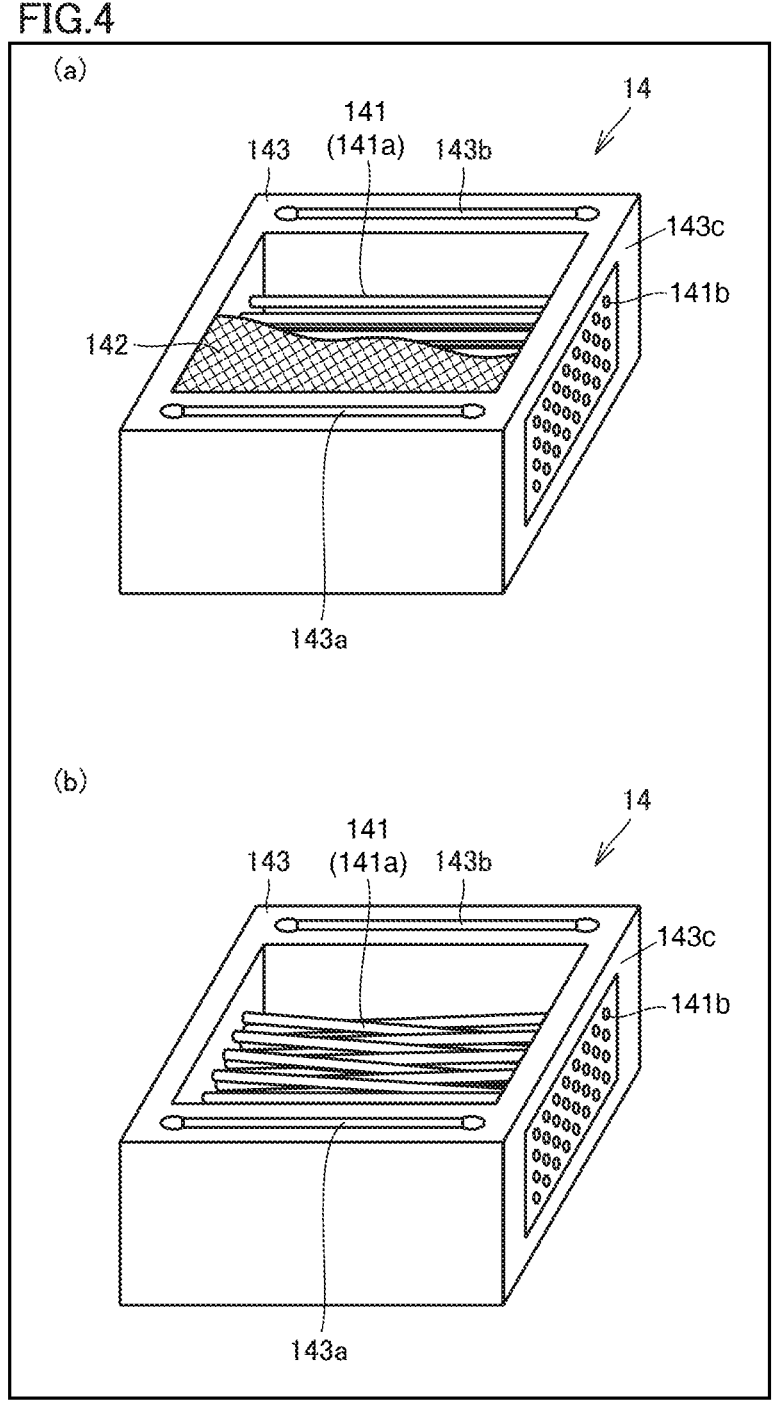
FIG. 4 is another schematic view for describing a configuration of a part of the sheet-shaped hollow fiber membrane module according to the embodiment of the present invention.
Figure 5:
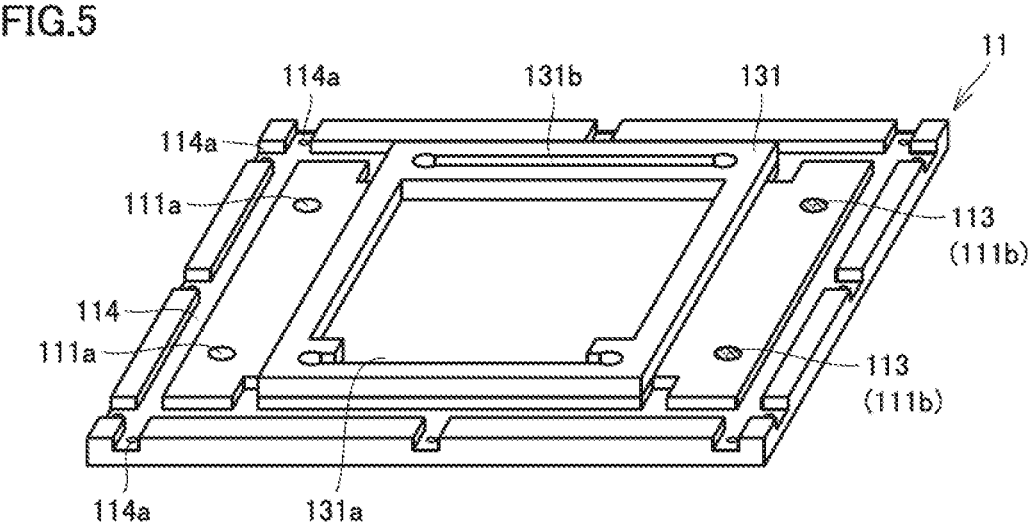
FIG. 5 is another schematic view for describing a configuration of a part of the sheet-shaped hollow fiber membrane module according to the embodiment of the present invention.
Figure 6:
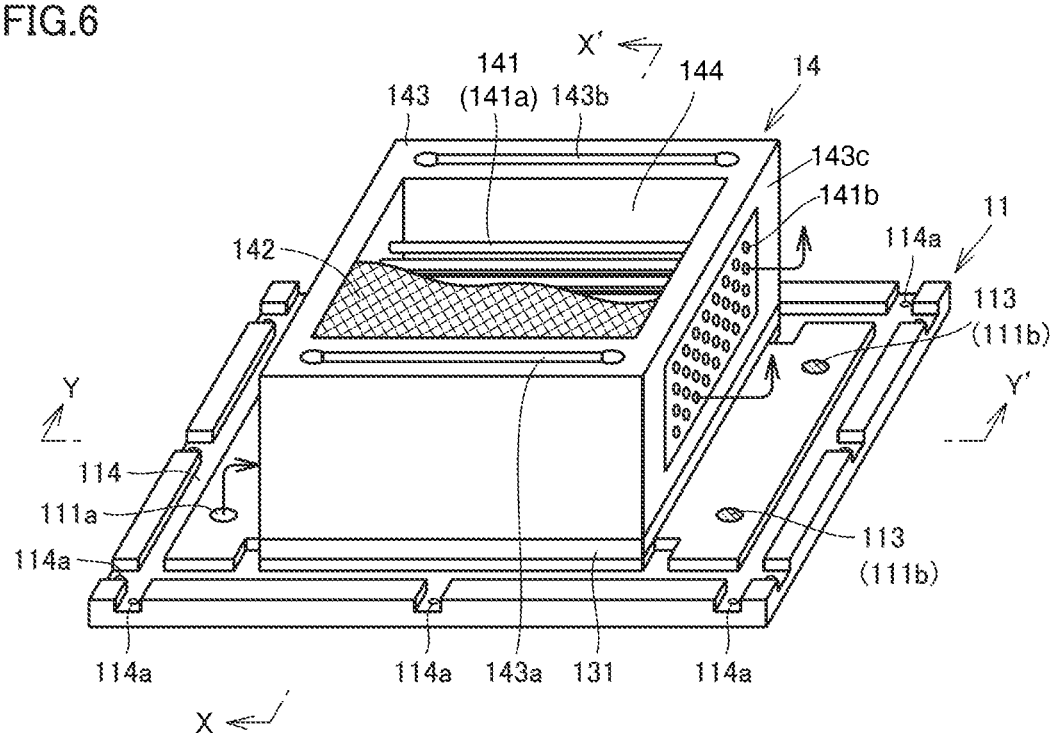
FIG. 6 is another schematic view for describing a configuration of a part of the sheet-shaped hollow fiber membrane module according to the embodiment of the present invention.
Figure 7:
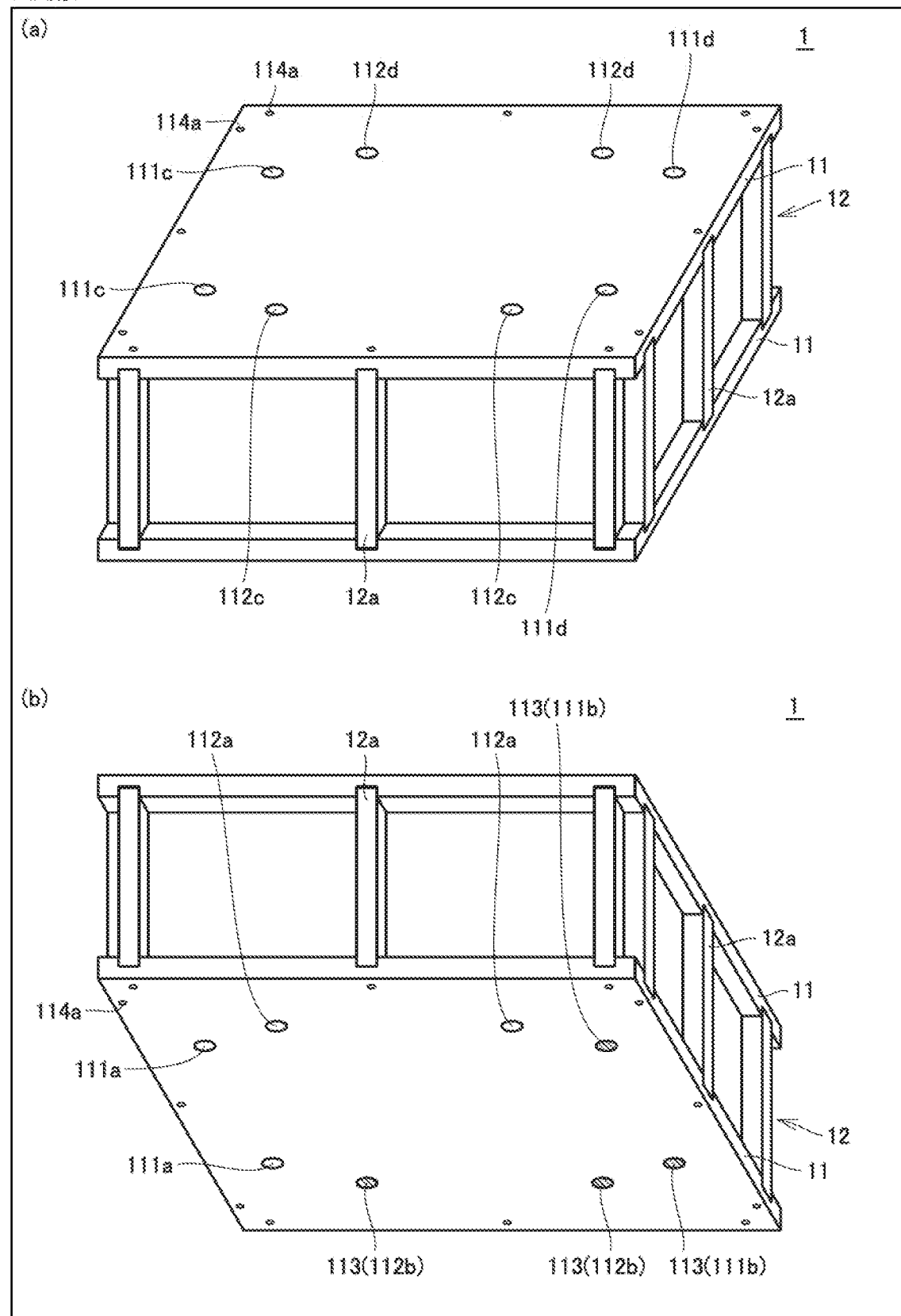
FIG. 7 is a schematic view for describing a configuration of the sheet-shaped hollow fiber membrane module according to the embodiment of the present invention.

The sheet-shaped hollow fiber membrane module according to the present embodiment includes end plates 11 (two pieces) shown in FIG. 1, a side wall 12 shown in FIG. 2, spacers 131, 132 shown in FIG. 3, and a membrane plate 14 shown in FIG. 4(a) (see FIGS. 5 to 7). Thus, the sheet-shaped hollow fiber membrane module of the present embodiment is composed of only four kinds of components. Note that spacer 131 and spacer 132 are components having the same shape.

With reference to FIG. 1, each end plate 11 is a component in which grooves 114, bolt holes 114a, and holes 111a, 111b, 112a, 112b are provided in a rectangular flat plate. Ends of side wall 12 are respectively fitted into grooves 114 of end plates 11.

In this way, unevenness is formed on a surface of each component constituting the sheet-shaped hollow fiber membrane module, so that assembly of each component is facilitated. For example, assembling components is facilitated by forming grooves or mortises on the surface of one of the components to be assembled and by providing projections or tenons to fit into the grooves on the surface of the other component.

With reference to FIG. 2, side wall 12 is basically a rectangular tubular component, and has openings on both sides in a vertical direction of the drawing. In addition, side wall 12 has reinforcement ribs 12a on an outer peripheral surface thereof, and further has guides 12b for loading membrane plate 14 and spacers 131, 132 into an inside thereof on an inner peripheral surface.

Each rib 12a of side wall 12 has a through hole 12c penetrating rib 12a in a longitudinal direction. As a result, in a state where the ends of side wall 12 are respectively fitted into grooves 114 of two end plates 11 (a state where side wall 12 is sandwiched by two end plates 11), bolts are inserted through bolt holes 114a of end plates 11 and through holes 12c of end plates 11 to fix by nuts.

With reference to FIG. 3(a), spacer 131 is a flat plate having an opening 131a and an opening 131b formed therein. Also, with reference to FIG. 3(b), spacer 132 is a flat plate having an opening 132a and an opening 132b formed therein. In addition, spacer 132 is a component having the same shape as spacer 131 and merely has a different orientation of disposition.

With reference to FIG. 4(a), membrane plate 14 includes a plurality of hollow fiber membranes 141a arranged substantially parallel to each other and each having openings 141b at both ends. Both ends of each of hollow fiber membranes 141a are fixed to a rectangular tubular frame member 143 so as to penetrate side walls 143c of frame member 143 opposite to each other (in a left-right direction of the figure) (so that openings 141b on both sides of the hollow fiber membrane 141a respectively communicates with an outside of frame member 143).

Further, on side walls 143c of frame member 143 opposite to each other (in a depth direction of the figure), flow paths 143a, 143b respectively penetrating the side walls 143c in a height direction of the side walls 143c are provided.

Furthermore, two straightening sheets 142 are provided so as to sandwich the plurality of hollow fiber membranes 141a in the vertical direction of the figure. In addition, although only upper-side straightening sheet 142 is drawn in FIG. 4, similar straightening sheet 142 is also provided on the lower side.

A state where spacer 131 is combined with end plate 11 is shown in FIG. 5. In this state, opening 131a communicates with holes 112a of end plate 11, and opening 131b communicates with holes 112b of end plate 11. In addition, although side wall 12 is omitted in FIG. 5, actually, after side wall 12 is combined with end plate 11, spacer 131 is loaded along guides 12b of side wall 12.

In FIG. 5, holes 111b of end plate 11 are closed with plugs 113. As a result, as indicated by an arrow in FIG. 6, fluid (DS or FS) flowing into from holes 111a of lower-side end plate 11 passes through insides of hollow fiber membranes 141a and flows out from holes 111d of upper-side end plate 11 (FIG. 7(a)).

A state where membrane plate 14 is further combined with end plate 11 and spacer 131 is shown in FIG. 6. Although side wall 12 is omitted in FIG. 6, actually, after side wall 12 is combined with end plate 11 and spacer 131 is loaded, membrane plate 14 is loaded along guides 12b of side wall 12.

In the state shown in FIG. 6, flow path 143a communicates with opening 131a, and flow path 143b communicates with opening 131b. As a result, the fluid flows into from holes 112a of lower-side end plate 11 via opening 131a of lower-side spacer 131, a part of the fluid flows an outside portion of the plurality of hollow fiber membranes 141 inside frame member 143, and flows out from holes 112d (FIG. 7(a)) of upper-side end plate 11 via opening 132b of upper-side spacer 132. A part of the remaining fluid passes through flow path 143a of membrane plate 14, and flows out from holes 112c (FIG. 7(a)) of upper-side end plate 11 via opening 132a of upper-side spacer 132.

FIG. 7 is a perspective view of the sheet-shaped hollow fiber membrane module formed by combining two end plates 11, side wall 12, spacers 131, 132, and membrane plate 14. That is, in a state shown in FIG. 5, spacer 132 is loaded on membrane plate 14, and end plate 11 is placed on spacer 132 so that grooves 114 face downward. Note that FIG. 7(a) is a view as seen from diagonally above, and FIG. 7(b) is a view as seen from diagonally below.

A length of one side of a main surface of the sheet-shaped hollow fiber membrane module is, for example, about 0.5 to 1 m. A thickness of the sheet-shaped hollow fiber membrane module is, for example, about 1 to 50 cm. A shape of the sheet-shaped hollow fiber membrane module is a rectangular parallelepiped (a flat plate shape) in which a thickness is smaller than a length of another side in this way.

In FIG. 7(b), holes 111b and holes 112b of lower-side end plate 11 are closed by plugs 113, and the other holes 111a and 112a of lower-side end plate 11 and all holes (111c, 111d, 112c, 112d) of upper-side end plate 11 are not closed. This is a form corresponding to a sheet-shaped hollow fiber membrane module 1a shown in FIG. 9 and sheet-shaped hollow fiber membrane module 1a shown in FIG. 11 to be described later, and the present invention is not limited to such a form.

In a form shown in FIG. 7 (see FIGS. 7, 6, and the like), frame member 143 of membrane plate 14, spacers 131, 132 (not shown in FIG. 6), and two end plates 11 constitute "a casing" for accommodating a plurality of hollow fibers 141 inside the chamber 144 of the casing. The casing is formed into a shape conforming to a shape of the sheet-shaped hollow fiber membrane module, and as in the sheet-shaped hollow fiber membrane module, the casing is formed into a sheet shape, that is, a rectangular parallelepiped shape (the flat plate shape) in which the thickness is smaller than the length of another side.

Each of holes 112a serves as "a supply port" for the fluid into the casing, and each of holes 112c, 112d serves as "a discharge port" for the fluid in the casing. Each hole 112b that serves as the supply port is closable, and is closed by plug 113 in FIG. 7.

These supply ports (holes 112a, 112b) and the discharge ports (holes 112c, 112d) are disposed outside the plurality of hollow fiber membranes 141a when seen from a direction perpendicular to the main surface of the casing (end plate 11).

The plurality of supply ports include two supply ports (holes 112a, 112b) disposed at positions facing the plurality of hollow fiber membranes 141a when seen from the direction perpendicular to the main surface of the casing, and one of the two supply ports is closable. In addition, the plurality of discharge ports include two discharge ports (holes 112c, 112d) disposed at positions facing the plurality of hollow fiber membranes 141a when seen from the direction perpendicular to the main surface of the casing, and one of the two discharge ports is closable.

Figure 11:
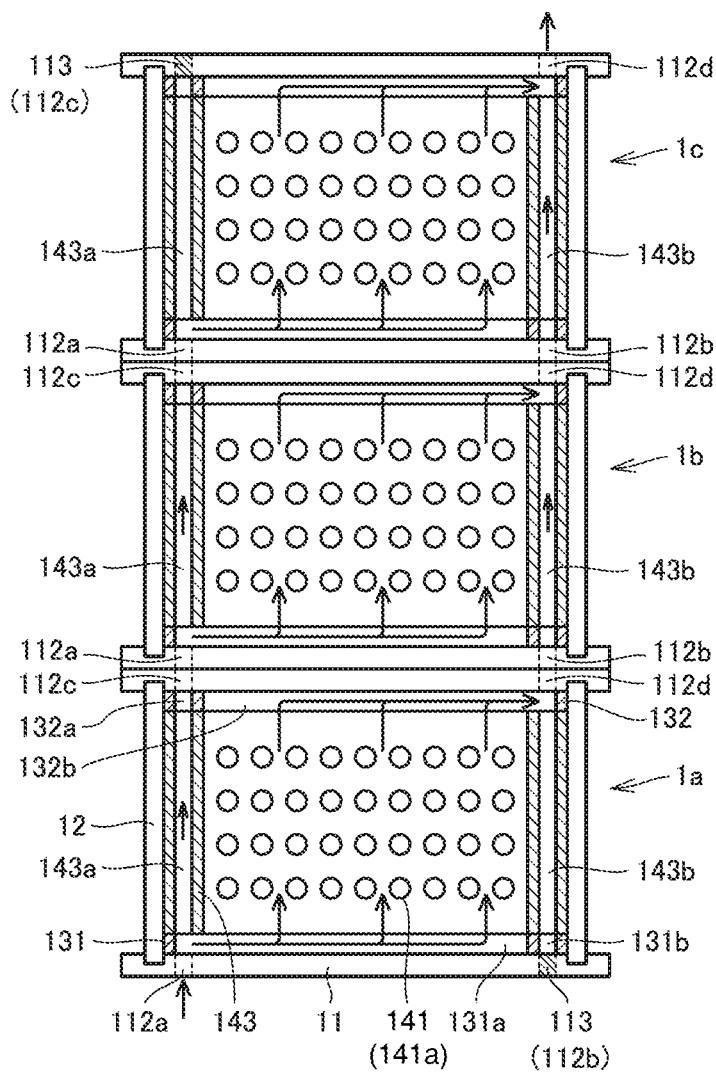
FIG. 11 is a schematic view showing a cross section taken along line X-X' in FIG. 8 (see a cross section taken along line X-X' in FIG. 6).
Figure 12:
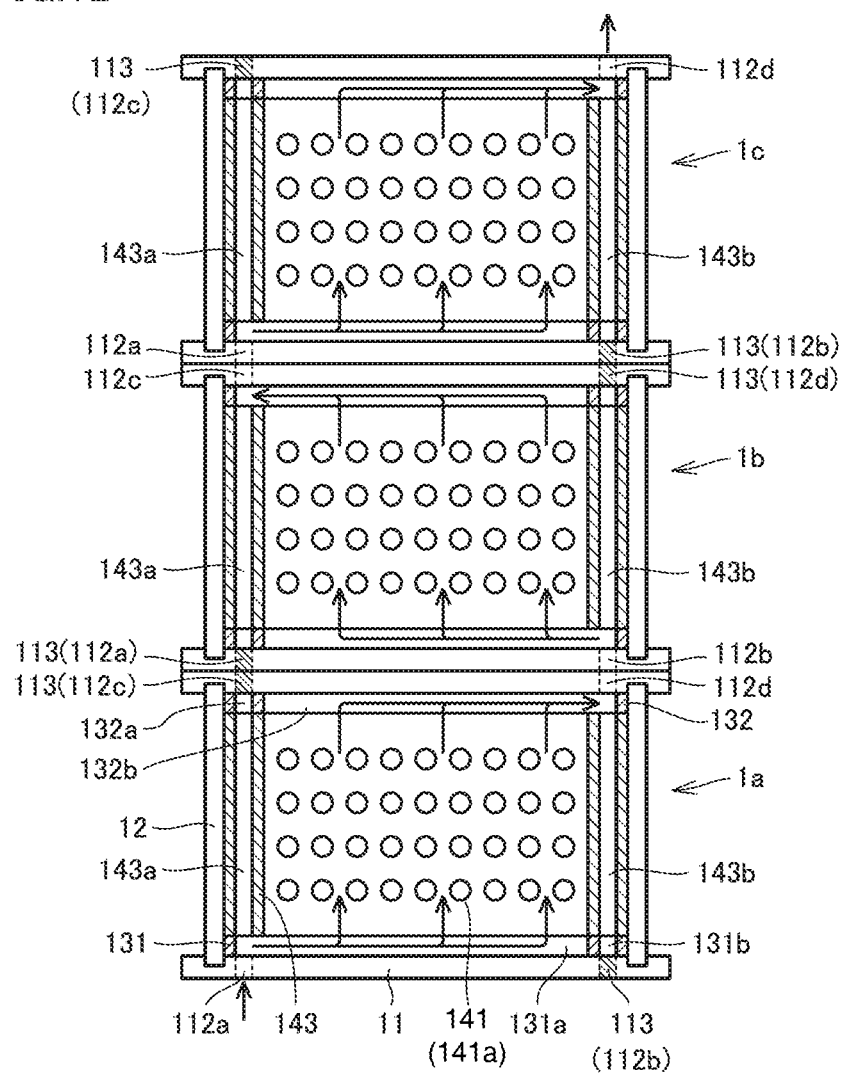
FIG. 12 is another schematic view showing the cross section taken along line X-X' in FIG. 8 (see the cross section taken along line X-X' in FIG. 6).

According to such disposition of the supply ports and the discharge ports, as shown in FIGS. 11 and 12 to be described later, in a membrane separation unit formed by connecting a plurality of sheet-shaped hollow fiber membrane modules, flow paths inside the casing (outside the plurality of hollow fiber membranes 141a) are freely designed by closing at least one of the plurality of supply ports and the plurality of discharge ports. Then, as shown in FIG. 11 to be described later, pressure loss of the membrane separation unit is greatly reduced by connecting the flow paths inside the casing (outside the plurality of hollow fiber membranes 141a) in parallel. Therefore, according to the present embodiment, in a membrane separation apparatus using the hollow fiber membrane with high membrane permeation efficiency, the pressure loss is reduced and membrane separation efficiency is suppressed from decreasing.

Further, the membrane separation efficiency is improved by appropriately controlling a position where the fluid passes inside the casing (outside the plurality of hollow fiber membranes 141a) and flowing the fluid in an appropriate range and direction.

Figure 9:
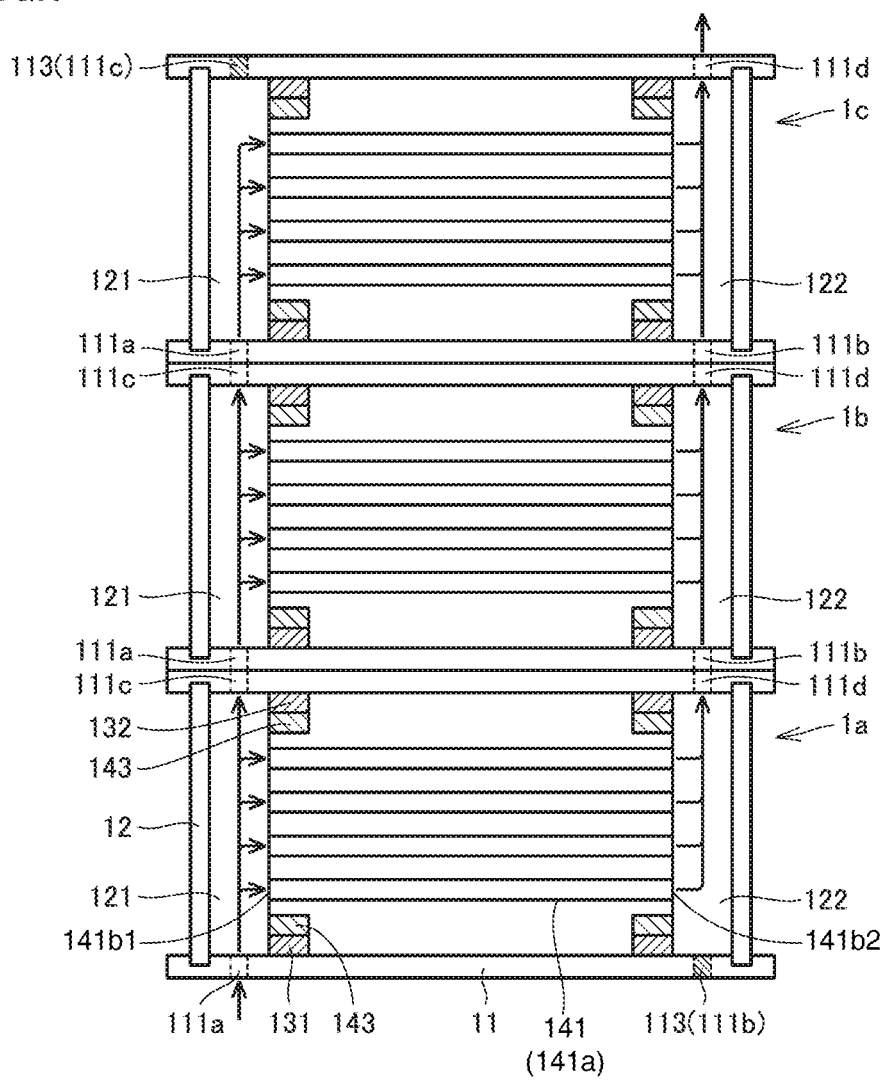
FIG. 9 is a schematic view showing a cross section taken along line Y-Y' in FIG. 8 (see a cross section taken along line Y-Y' in FIG. 6).

In addition, a first flow path 121 communicating with the inside of each of the plurality of hollow fiber membranes via a first opening 141b1 and a second flow path 122 communicating with the inside of each of the plurality of hollow fiber membranes via a second opening 141b2 are provided outside the casing when seen from the direction perpendicular to the main surface of the casing (end plate 11) (see FIG. 9).

First flow path 121 has first inlets (holes 111a) and first outlets (holes 111c), and second flow path 122 has second inlets (holes 111b) and second outlets (holes 111d). One of the first inlet (hole 111a) and the second inlet (hole 111b) is closable and one of the first outlet (hole 111c) and the second outlet (hole 111d) is closable.

Figure 10:
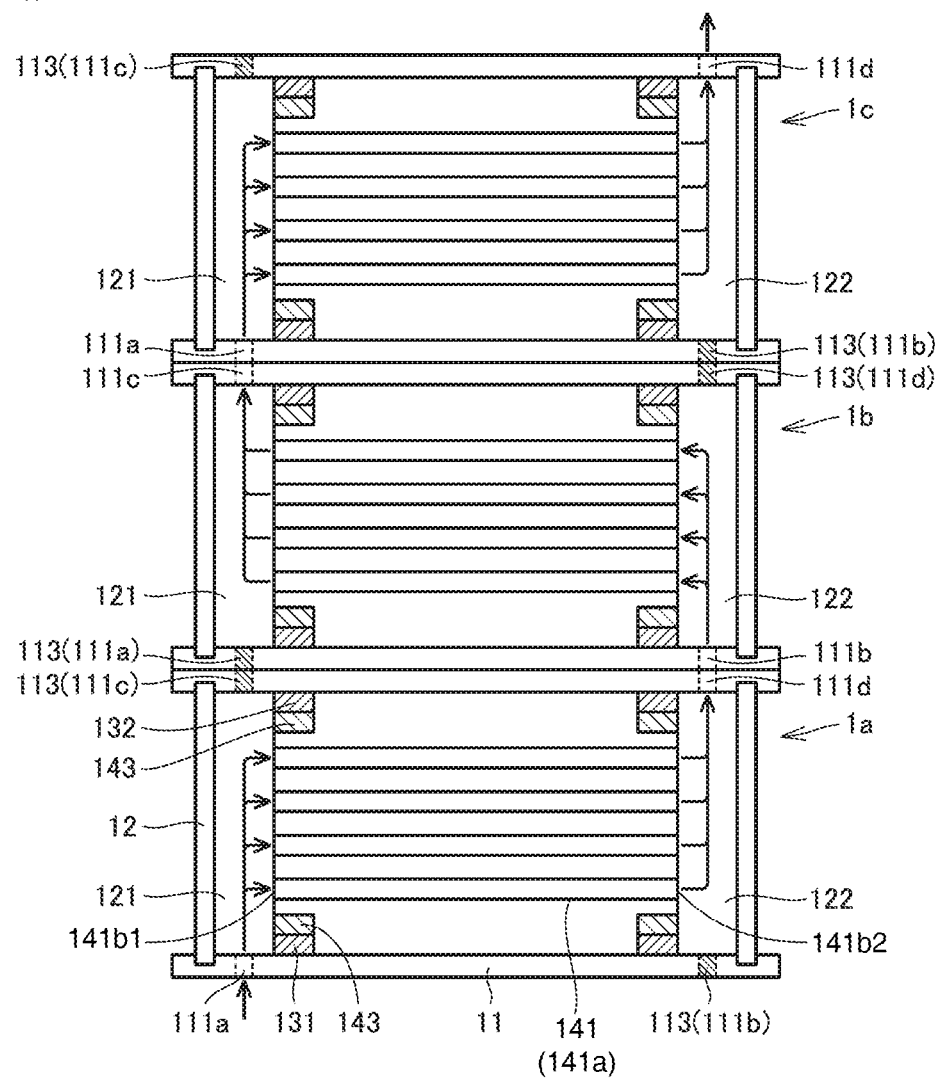
FIG. 10 is another schematic view showing the cross section taken along line Y-Y' in FIG. 8 (see the cross section taken along line Y-Y' in FIG. 6).

As a result, as shown in FIG. 9 or 10 to be described later, the flow path passing through the plurality of hollow fiber membranes 141a is freely designed in the membrane separation unit formed by connecting the plurality of sheet-shaped hollow fiber membrane modules. Then, as shown in FIG. 9 to be described later, by connecting the flow paths passing through the plurality of hollow fiber membranes 141a in parallel, the pressure loss of the membrane separation unit is greatly reduced. Therefore, according to the present embodiment, in a membrane separation apparatus using the hollow fiber membrane with high membrane permeation efficiency, the pressure loss is reduced and membrane separation efficiency is suppressed from decreasing.

A configuration of membrane plate 14 will be described in detail hereinafter. In membrane plate 14, the plurality of hollow fiber membranes 141a are disposed with a predetermined gap each other in a direction parallel to the main surface of the casing (end plate 11). An inner diameter of each hollow fiber membrane 141a is, for example, about 10 to 300 μm. An outer diameter of each hollow fiber membrane 141 is, for example, about 100 to 500 μm.

Examples of a semipermeable membrane constituting hollow fiber membrane 141a include a semipermeable membrane called a reverse osmosis membrane (RO membrane), a forward osmosis membrane (FO membrane), a nanofiltration membrane (NF membrane), and an ultrafiltration membrane (UF membrane). The semipermeable membrane is preferably the reverse osmosis membrane, the forward osmosis membrane or the nanofiltration membrane.

Usually, a pore size of each of the RO membrane and the FO membrane is less than or equal to about 2 nm, and a pore size of the UF membrane is about 2 to 100 nm. The NF membrane has a relatively low rejection rate of ion and salts in the RO membrane, and usually a pore size of the NF membrane is about 1 to 2 nm. When the RO membrane, the FO membrane or the NF membrane is used as the semipermeable membrane, a salt removal rate of the RO membrane, the FO membrane or the NF membrane is preferably greater than or equal to 90%.

A material constituting the semipermeable membrane is not particularly limited, but, for examples, can be a cellulose-based resin, a polysulfone-based resin, a polyamide-based resin and the like. The semipermeable membrane is preferably composed of a material containing at least one of the cellulose-based resin and the polysulfone-based resin.

The cellulose-based resin is preferably a cellulose acetate-based resin. The cellulose acetate-based resin has resistance to chlorine as a bactericide, and has a feature capable of suppressing increase of microorganisms. The cellulose acetate-based resin is preferably cellulose acetate, and more preferably cellulose triacetate from a viewpoint of durability.

The polysulfone-based resin is preferably a polyether sulfone-based resin. The polyether sulfone-based resin is preferably sulfonated polyethersulfone.

As an example of a specific hollow fiber membrane (the hollow-fiber-type semipermeable membrane), a membrane having a single-layer structure in which the whole is made of the cellulose-based resin can be mentioned. However, a term "single-layer structure" as used herein does not necessarily mean that an entire layer is a uniform membrane. For example, it is preferable that a dense layer is provided near an outer peripheral surface, and this dense layer is a separation active layer that substantially defines the pore size of the hollow-fiber-type semipermeable membrane.

As another example of the specific hollow-fiber-type semipermeable membrane, a membrane with a two-layer structure having a dense layer made of a polyphenylene-based resin (for example, sulfonated polyethersulfone) on an outer peripheral surface of a support layer (for example, a layer formed of polyphenylene oxide) can be mentioned. As still another example, a membrane with a two-layer structure having a dense layer made of a polyamide-based resin on the outer peripheral surface of the support layer (for example, a layer made of polysulfone or polyether sulfone) can be mentioned.

In making a conventional cylindrical hollow fiber membrane element, as disclosed in, for example, U.S. Pat. Nos. 4,412,486, 4,277,147, 3,591,618, 3,008,886 and the like, 45 to 90 or more hollow fiber membranes are collected to form one hollow fiber membrane aggregate, and a plurality of the hollow fiber membrane aggregates are arranged side by side to form a sheet-shaped hollow fiber membrane bundle. Then, this hollow fiber membrane bundle is wound around a center tube having a large number of holes while traversing (reciprocating in an axial direction of the center tube). By adopting such a method, an appropriate gap is equally provided between the hollow fiber membranes while increasing a filling factor of the hollow fiber membranes, so that drift of the fluid flowing outside the hollow fiber membranes is suppressed.

However, since sheet-shaped hollow fiber membrane module 1 (membrane plate 14) has no center tube, the making method as described above is not adopted in its production. Therefore, for example, membrane plate 14 is made by binding the plurality of hollow fiber membranes (hollow-fiber-type semipermeable membranes) 141a and fixing (potting) both ends by resin or the like.

In order to make the sheet-shaped hollow fiber membrane module having a high filling factor and capable of suppressing the drift, it is preferable that a hollow fiber membrane bundle sheet 141 to be integrated in a state where the plurality of hollow fiber membranes 141a are disposed in a plane is made as described below and membrane plate 14 is made using this hollow fiber membrane bundle sheet 141.

Membrane plate 14 (a sheet-shaped hollow fiber membrane element) is made by making a knitted fabric (the hollow fiber membrane bundle sheet) 141 in which the plurality of hollow fiber membranes 141a are disposed substantially in parallel and are integrated with wefts like a bamboo blind, and fixing the hollow fiber membrane bundle sheet 141 of a predetermined length (may be a laminated body in which a plurality of the hollow fiber membrane bundle sheet 141 are laminated) to a frame member of a predetermined size. As a result, the hollow fiber membrane 141a is prevented from being bent, broken, and so on due to a pressure of the fluid (the FS or the DS) or its own weight. In particular, since the hollow fiber membrane 141a tends to be broken at an interface portion (a wicking portion) with a bonded portion of the hollow fiber membrane 141a, by tying this portion with the weft, the hollow fiber membrane 141a is more certainly prevented from being bent, broken, and so on.

Further, the hollow fiber membrane bundle sheet 141 may be made by winding the hollow fiber membrane 141a in a predetermined frame (a bobbin) or the like so that an interval becomes uniform, while traversing the hollow fiber membrane 141a at a constant speed, and cutting a part of an obtained winding product. In this case, the hollow fiber membranes 141a may be disposed to cross each other as shown in FIG. 4(*b*), different kinds of hollow fiber membranes 141a may be combined, and the like. By arranging in a cross-disposition, gaps are regularly formed at crossing portions of the hollow fiber membranes 141a (bundles 141), so that it is less likely that non-dissolved ingredients, particle ingredients and the like in the fluid flowing outside the hollow fiber membranes are caught between the hollow fiber membranes 141a, and an increase of the pressure loss hardly occurs. In addition, effects such as suppression of drift of the fluid flowing outside the hollow fiber membrane 141a, and an improvement of self-shape retentivity (support of the hollow fiber membranes 141a each other) are obtained. Note that the cross-disposition may be, for example, a disposition in which the plurality of hollow fiber membranes 141a cross when seen from a width direction of the membrane plate (see FIG. 4(*b*)) or a disposition in which the plurality of hollow fiber membranes 141a cross when seen from a thickness direction (the direction perpendicular to the main surface of membrane plate 14).

Further, the hollow fiber membrane bundle sheet 141 may be disposed on the straightening sheet 142 (a mesh, a punching plate or the like) having a plurality of through holes. That is, in the hollow fiber membrane bundle sheet 141, the plurality of hollow fiber membranes 141a may be integrated by being fixed to one surface of the straightening sheet 142. Further, the straightening sheet 142 may be disposed outside the hollow fiber membrane bundle sheet 141, between adjacent hollow fiber membrane bundle sheets 141, or the like. In this way, since the hollow fiber membrane bundle sheet 141 is held by the straightening sheet 142, the hollow fiber membrane 141a is prevented from being bent, broken, or the like due to the pressure of the fluid (the FS or the DS) or its own weight.

By providing the straightening sheet 142 having the plurality of through holes in membrane plate 14 (the casing), a flow of the fluid inside membrane plate 14 (the outside of hollow fiber membrane 141a) is uniformed and the drift or the like is suppressed. Although an open area ratio of the straightening sheet is not particularly limited, it is preferably greater than or equal to 30%.

[Membrane Separation Unit]

A configuration of the membrane separation unit of the present embodiment will be described with reference to FIGS. 8 to 12 hereinafter.

Figure 8:
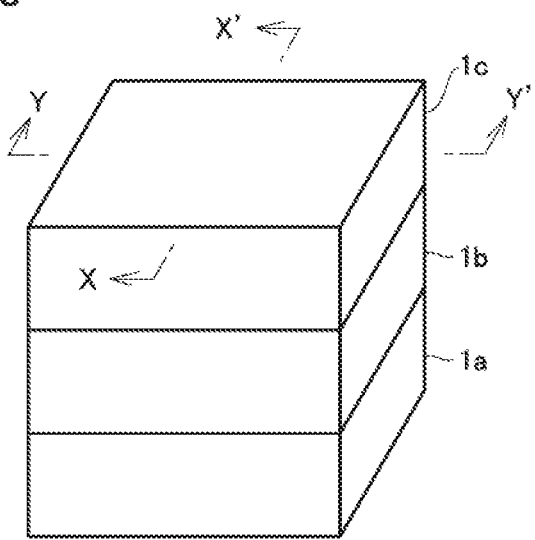
FIG. 8 is a schematic view for describing a configuration of a membrane separation unit according to the embodiment of the present invention.

With reference to FIG. 8, in the membrane separation unit of the present embodiment, a plurality of sheet-shaped hollow fiber membrane modules 1a, 1b, 1c are connected in a vertical direction (the direction perpendicular to the main surface of the sheet-shaped hollow fiber membrane module). In FIG. 8, details of each sheet-shaped hollow fiber membrane module are omitted.

In each of FIGS. 9 and 10, a cross-section taken along line Y-Y' in FIG. 8 (see a cross-section taken along line Y-Y' in FIG. 6) is shown. A form in which the flow paths of the fluid passing through the inside of hollow fiber membranes 141a of sheet-shaped hollow fiber membrane modules 1a, 1b, 1c are connected in parallel is shown in FIG. 9. A form in which the flow paths of the fluid passing through the inside of hollow fiber membranes 141a of sheet-shaped hollow fiber membrane modules 1a, 1b, 1c are connected in series is shown in FIG. 10.

In FIG. 9, holes 111b of sheet-shaped hollow fiber membrane module 1a are closed by plugs 113, and holes 111c of sheet-shaped hollow fiber membrane module 1c are closed by plugs 113. Holes 111a, 111b, 111c, 111d of end plates 11 are not closed. As a result, when the fluid flows into first flow path 121 from each hole 111a of lower-side end plate 11 of sheet-shaped hollow fiber membrane module 1a, a part of the fluid flows inside each of hollow fiber membranes 141a via first opening 141b1, passes through each second opening 141b2, second flow path 122, each hole 111d, and each hole 111b of sheet-shaped hollow fiber membrane module 1b in this order, and flows out to second flow path 122 of sheet-shaped hollow fiber membrane module 1b. The other part of the fluid in first flow path 121 passes through each hole 111c and each hole 111a of sheet-shaped hollow fiber membrane module 1b in this order, and flows out to first flow path 121 of sheet-shaped hollow fiber membrane module 1b.

Hereinafter, in the configuration shown in FIG. 9, as indicated by arrows, the fluid flows in parallel inside hollow fiber membranes 141a of sheet-shaped hollow fiber membrane modules 1a, 1b, 1c, and finally flows out from each hole 111d of sheet-shaped hollow fiber membrane module 1c.

On the other hand, in FIG. 10, as indicated by arrows, the fluid flows in series inside hollow fiber membranes 141a of sheet-shaped hollow fiber membrane modules 1a, 1b, 1c. The holes of each end plate 11 are closed by plugs 113 so as to form such a serial flow path.

In addition, the case where the fluid flows in parallel as shown in FIG. 9 is preferable in that the pressure loss is small as compared with the case where the fluid flows in series as shown in FIG. 10. Particularly, when the DS or the like having a relatively high viscosity (for example, the viscosity greater than or equal to 10 cp) is flowed inside hollow fiber membranes 141a (hollow portions), it is preferable to connect the plurality of sheet-shaped hollow fiber membrane modules as shown in FIG. 9.

However, when the viscosity of the fluid flowing inside the hollow fiber membrane is low, or when a flow rate is small and the pressure loss itself is sufficiently small, in the case where the fluid flows in series inside the hollow-fiber-type semipermeable membrane as shown in FIG. 10, a flow velocity is increased and a concentration polarization is made small as compared with the case where the fluid flows in parallel inside the hollow-fiber-type semipermeable membrane as shown in FIG. 9. Therefore, membrane permeation efficiency is sometimes increased. For this reason, whether to make the flow paths in parallel or in series is appropriately selected according to purpose of use, expected effect, and the like. In addition, a parallel flow path and a serial flow path may be combined.

In each of FIGS. 11 and 12, a cross-section taken along line X-X' in FIG. 8 (see a cross-section taken along line X-X' in FIG. 6) is shown. A form in which the flow paths of the fluid passing through the outside of hollow fiber membranes 141 of sheet-shaped hollow fiber membrane modules 1a, 1b, 1c are connected in parallel is shown in FIG. 11. A form in which the flow paths of the fluid passing through the outside of hollow fiber membranes 141a of sheet-shaped hollow fiber membrane modules 1a, 1b, 1c are connected in series is shown in FIG. 12.

In FIG. 11, holes 112b of sheet-shaped hollow fiber membrane module 1a are closed by plugs 113, and holes 112c of sheet-shaped hollow fiber membrane module 1c are closed by plugs 113. Holes 112a, 112b, 112c, 112d of end plates 11 are not closed.

As a result, when the fluid flows from each hole 112a of lower-side end plate 11 of sheet-shaped hollow fiber membrane module 1a, a part of the fluid passes through opening 131a of spacer 131, the outside of the plurality of hollow fiber membranes 141 inside frame member 143 (membrane plate 14), opening 132b of spacer 132, each hole 112d, and each hole 112b of sheet-shaped hollow fiber membrane module 1b in this order, and flows out to flow path 143b of sheet-shaped hollow fiber membrane module 1b. The other part of the fluid passes through opening 131a of spacer 131, flow path 143a, opening 132a of spacer 132, each hole 112c, and each hole 112a of sheet-shaped hollow fiber membrane module 1b in this order, and flows out to flow path 143a of sheet-shaped hollow fiber membrane module 1b.

Hereinafter, in the configuration shown in FIG. 11, as indicated by arrows, the fluid flows in parallel outside hollow fiber membranes 141a of sheet-shaped hollow fiber membrane modules 1a, 1b, 1c, and finally flows out from holes 112d of sheet-shaped hollow fiber membrane module 1c.

On the other hand, in FIG. 12, as indicated by arrows, the fluid flows in series outside hollow fiber membranes 141a of sheet-shaped hollow fiber membrane modules 1a, 1b, 1c. The holes of each end plate 11 are closed by plugs 113 so as to form such a serial flow path.

In addition, the case where the fluid flows in parallel as shown in FIG. 11 is preferable in that the pressure loss is small as compared with the case where the fluid flows in series as shown in FIG. 12. Particularly, when the DS or the like having a relatively high viscosity is flowed outside hollow fiber membranes 141a, it is preferable to connect the plurality of sheet-shaped hollow fiber membrane modules as shown in FIG. 11.

However, when the viscosity of the fluid flowing outside the hollow-fiber-type semipermeable membrane is low, or when the flow rate is small and the pressure loss itself is sufficiently small, in the case where the fluid flows in series outside the hollow-fiber-type semipermeable membrane as shown in FIG. 12, the flow velocity is increased and the concentration polarization is made small as compared with the case where the fluid flows in parallel outside the hollow-fiber-type semipermeable membrane as shown in FIG. 11. Therefore, the membrane permeation efficiency is sometimes increased. For this reason, whether to make the flow paths in parallel or in series is appropriately selected according to purpose of use, expected effect, and the like. In addition, a parallel flow path and a serial flow path may be combined.

[Membrane Separation Apparatus]

A membrane separation apparatus of the present embodiment includes the membrane separation unit described above, and further includes other instruments such as a flow path and a pump for circulating the DS and the FS. As an instrument other than the membrane separation unit, various well-known instruments used in the membrane separation apparatus can be used.

[Forward Osmosis Treatment]

When the sheet-shaped hollow fiber membrane module or the membrane separation unit of the present embodiment is used for the forward osmosis treatment, a feed solution (the FS) containing water and a draw solution (the DS) containing a draw solute and having a higher osmotic pressure than the feed solution are brought into contact with each other via the hollow fiber membrane, so that water contained in the FS is transferred (permeated, transmitted) into the DS by a forward osmotic phenomenon.

The feed solution (the FS, water to be treated) may be any liquid containing water, such as sea water, brackish water, brine, produced water from a well, lake water, river water, and industrial wastewater. In particular, it is useful that freshwater is obtained at such as coastal areas where it is difficult to obtain the freshwater. Therefore, the FS is preferably the sea water, the brackish water, the brine, the produced water from the well and so on that are easily obtained at such places.

There are no particular restrictions on a well, as long as it exhausts produced water, and it may be the well in which, for example, petroleum, shale gas, oil sand, carbon methane (CBM) and so on are mined. The produced water is water that is exhausted accompanying a mining target from the well, and contains salt, organic matter, suspension and the like.

The sheet-shaped hollow fiber membrane module of the present embodiment is useful particularly when the viscosity of the draw solution is relatively high. Examples of the draw solute used for the draw solution of relatively high viscosity include saccharide, protein, and synthetic polymer. From viewpoints of easy recovery and easy recycle, a stimulus responsive polymer is preferable. Examples of the stimulus responsive polymer include a temperature responsive polymer, a pH responsive polymer, a photoresponsive polymer, and a magnetically responsive polymer.

The temperature responsive polymer is a polymer having a characteristic (temperature responsiveness) in which hydrophilicity changes with a predetermined temperature as a critical point. In other words, the temperature responsiveness is a characteristic of becoming hydrophilic or hydrophobic depending on the temperature. It is preferable that the change in hydrophilicity is reversible. In this case, by adjusting the temperature, the temperature responsive polymer is dissolved in water or phase-separated from water. Note that the temperature responsive polymer is disclosed in, for example, Japanese Patent Laying-Open No. 2015-47541.

The temperature responsive polymer is a polymer composed of a plurality of structural units derived from a monomer, and preferably has a hydrophilic group on a side chain.

There are a lower critical solution temperature (LCST) type and an upper critical solution temperature (UCST) type for the temperature responsive polymer. In the LCST type, when a polymer dissolved in low temperature water reaches a temperature that is higher than or equal to an intrinsic temperature (LCST) of the polymer, the polymer phase-separates from water. To the contrary, in the UCST type, when a polymer dissolved in high temperature water reaches a temperature that is lower than or equal to an intrinsic temperature (UCST) of the polymer, the polymer phase-separates from water (see Sugihara et al., "Development to Self-Organization of Stimuli-Responsive Polymers", SEN'I GAKKAISHI (Sen'i To Kogyo), Vol. 62, No. 8, 2006).

In the case of using a semipermeable membrane composed of a material that is easily deteriorated at high temperature, it is desirable that the temperature responsive polymer dissolved in low temperature water is in contact with the semipermeable membrane, so that the temperature responsive polymer used for the present invention is preferably the LCST type. Further, in the case of using a semipermeable membrane composed of a material that is hardly deteriorated at the high temperature, the UCST type is also used in addition to the LCST type.

Examples of the hydrophilic group include a hydroxyl group, a carboxyl group, an acetyl group, an aldehyde group, an ether linkage, and an ester linkage. The hydrophilic group is preferably at least one type selected from these.

The temperature responsive polymer preferably has at least one hydrophilic group in at least a part or all of the structural unit. Further, the temperature responsive polymer may have a hydrophobic group in a part of the structural unit while having the hydrophilic group. It is considered that balance between the hydrophilic group and the hydrophobic group contained in a molecule is important, in order that the temperature responsive polymer has the temperature responsiveness.

Examples of the specific temperature responsive polymer include a polyvinyl ether-based polymer, a polyvinyl acetate-based polymer, and an (meth)acrylic acid-based polymer.

The viscosity of the draw solution is preferably greater than or equal to 0.05 Pa·s, more preferably greater than or equal to 0.10 Pa·s. In the case of using such a high viscosity solution as the draw solution, particularly efficiency of the forward osmosis treatment tends to decrease, so that the sheet-shaped hollow fiber membrane module and the membrane separation unit of the present invention are useful.

The osmotic pressure of the draw solution is preferably from 0.5 to 10 MPa, more preferably from 1 to 9 MPa, still more preferably from 2 to 8 MPa although it depends on a molecular weight of the solute and the like.

It should be understood that the embodiment disclosed herein is an example in all respects and is not restrictive. The scope of the present invention is defined not by the description above but by the claims, and it is intended that all modifications within meaning and scope equivalent to the claims are included.

REFERENCE SIGNS LIST 1, 1a, 1b, 1c: membrane module, 11: end plate, 111a, 111b, 111c, 111d, 112a, 112b, 112c, 112d: hole, 113: plug, 114: groove, 114a: bolt hole, 12: side wall, 121: first flow path, 122: 25 second flow path, 12a: rib, 12b: guide, 131, 132: spacer, 131a, 131b, 132a, 132b: opening, 14: membrane plate, 141: hollow fiber membrane bundle sheet, 141a: hollow fiber membrane, 141b: opening, 142: straightening sheet, 143: frame member, 143a, 143b: flow path, 144: chamber of the casing.

The invention claimed is:

1. A sheet-shaped hollow fiber membrane module comprising:
    a housing formed by a pair of main plates and four side plates that are joined perpendicularly to the pair of main plates;
    four side walls disposed inside the housing to define a chamber therebetween;
    a plurality of hollow fiber membranes accommodated inside the chamber;
    a plurality of supply ports in one of the pair of main plates; and
    a plurality of discharge ports in the other one of the pair of main plates,
    wherein
    at least one of the plurality of the supply ports is closable,
    at least one of the plurality of the discharge ports is closable,
    each of the plurality of hollow fiber membranes comprises a first end that penetrates a first side wall of the four side walls, and a second end that penetrates a second side wall of the four side walls opposite to the first side wall,
    a first opening at the first end of each of the plurality of hollow fiber membranes and a second opening at the second end of each of the plurality of hollow fiber membranes provide fluid communications to an outside of the chamber, and
    a third side wall and a fourth side wall of the four side walls each comprises a cavity that extends through a height of the respective third side wall and fourth side wall, the cavity being in fluid communication with the chamber.

2. The sheet-shaped hollow fiber membrane module according to claim 1, wherein:
    the plurality of supply ports and the plurality of discharge ports are disposed outside the plurality of hollow fiber membranes.

3. The sheet-shaped hollow fiber membrane module according to claim 2, wherein:
    two of the plurality of supply ports are disposed in one of the pair of main plates at positions facing the plurality of hollow fiber membranes, one of the two supply ports being closable, and
    two of the plurality of discharge ports are disposed in the other of the pair of main plates at positions facing the plurality of hollow fiber membranes, one of the two discharge ports being closable.

4. The sheet-shaped hollow fiber membrane module according to claim 1, further comprising:
    a first flow path that is disposed outside the chamber and that communicates with an inside of each of the plurality of hollow fiber membranes via the first opening; and
    a second flow path that is disposed outside the chamber and that communicates with the inside of each of the plurality of hollow fiber membranes via the second opening,
    wherein:
    the first flow path includes a first inlet and a first outlet and the second flow path includes a second inlet and a second outlet,
    one of the first inlet and the second inlet is closable, and one of the first outlet and the second outlet is closable.

5. The sheet-shaped hollow fiber membrane module according to claim 4, wherein the first flow path and the second flow path are disposed at positions facing the plurality of hollow fiber membranes respectively.

6. The sheet-shaped hollow fiber membrane module according to claim 1, wherein the plurality of hollow fiber membranes are disposed with a predetermined gap therebetween in a direction parallel to the pair of main plates.

7. The sheet-shaped hollow fiber membrane module according to claim 1, wherein the plurality of hollow fiber membranes are disposed in a plane to form a hollow fiber membrane bundle sheet.

8. The sheet-shaped hollow fiber membrane module according to claim 7, wherein the plurality of hollow fiber membranes are tied to each other by a weft.

9. The sheet-shaped hollow fiber membrane module according to claim 7, further comprising a straightening sheet having a plurality of through holes,
wherein the plurality of hollow fiber membranes are fixed to one surface of the straightening sheet.

10. The sheet-shaped hollow fiber membrane module according to claim 1, further comprising a straightening sheet that includes a plurality of through holes and that is disposed in the casing.

11. A membrane separation unit comprising a plurality of the sheet-shaped hollow fiber membrane modules according to claim 1.

12. The sheet-shaped hollow fiber membrane module according to claim 1, wherein two of the plurality of supply ports and two of the plurality of discharge ports are aligned with the cavity.

13. The sheet-shaped hollow fiber membrane module according to claim 1,
wherein a portion of the plurality of supply ports and a portion of the plurality of discharge ports do not overlap with the chamber.

14. The sheet-shaped hollow fiber membrane module according to claim 1, further comprising a plurality of plugs, wherein:
at least one of the plurality of supply ports is closed by one of the plurality of plugs, and
at least one of the plurality of the discharge ports is closed by another one of the plurality of plugs.

* * * * *